United States Patent [19]

Miller

[11] Patent Number: 5,357,742
[45] Date of Patent: Oct. 25, 1994

[54] TURBOJET COOLING SYSTEM

[75] Inventor: Franklin E. Miller, Cincinnati, Ohio

[73] Assignee: General Electric Company, Cincinnati, Ohio

[21] Appl. No.: 180,396

[22] Filed: Jan. 12, 1994

Related U.S. Application Data

[63] Continuation of Ser. No. 31,302, Mar. 12, 1993, abandoned.

[51] Int. Cl.$^5$ .......... F02C 6/18; F02K 11/00; B64B 1/24
[52] U.S. Cl. .......... 60/39.07; 60/262; 60/266; 60/39.83; 244/53 B
[58] Field of Search .......... 60/262, 266, 39.83, 60/39.07; 137/15.1, 15.2; 244/204, 209, 53 B

[56] References Cited

U.S. PATENT DOCUMENTS

| | | | |
|---|---|---|---|
| 2,833,492 | 5/1958 | Fowler | 244/209 |
| 2,853,854 | 9/1958 | Avery et al. | 60/39.66 |
| 3,058,302 | 10/1962 | Kuzyk | 60/35.6 |
| 3,752,422 | 8/1973 | Runnels et al. | 244/53 B |
| 4,002,024 | 1/1977 | Nye et al. | 60/262 |
| 4,214,441 | 7/1980 | Mouritsen et al. | 60/262 |
| 4,493,184 | 1/1985 | Nikkanen et al. | 60/204 |
| 4,546,605 | 10/1985 | Mortimer et al. | 60/39.07 |
| 4,608,819 | 9/1986 | Colman et al. | 60/266 |
| 4,715,779 | 12/1987 | Suciu | 60/39.07 |
| 4,749,150 | 6/1988 | Rose et al. | 244/53 B |
| 4,773,212 | 9/1988 | Griffin et al. | 60/39.02 |
| 4,993,663 | 2/1991 | Lahti et al. | 244/53 B |
| 5,012,639 | 5/1991 | Ream et al. | 60/226.1 |
| 5,127,222 | 7/1992 | Ream et al. | 60/204 |
| 5,137,230 | 8/1992 | Coffinberry | 60/39.07 |
| 5,161,364 | 11/1992 | Bruun et al. | 60/39.07 |
| 5,261,228 | 11/1993 | Shuba | 60/39.07 |
| 5,279,109 | 1/1994 | Liu et al. | 60/39.07 |

Primary Examiner—Richard A. Bertsch
Assistant Examiner—Howard R. Richman
Attorney, Agent, or Firm—Jerome C. Squillaro; Nathan D. Herkamp

[57] ABSTRACT

The hot core engine compartment of a turbojet engine is cooled by the metered flow of cooling air exhausted through a laminar flow nacelle system. This arrangement reduces the need for extracting bypass ram air from the engine performance cycle for cooling purposes and thereby improves specific fuel consumption and engine efficiency. A turbocompressor pump driven by bleed air from the core engine compressor draws cooling air through the laminar flow nacelle system and pumps the air into a manifold surrounding the core engine.

6 Claims, 4 Drawing Sheets

TURBOJET COOLING SYSTEM

This application is a continuation of application Ser. No. 08/031,302, filed Mar. 12, 1993, now abandoned.

BACKGROUND OF THE INVENTION

1. Field of the Invention

The present invention relates in general to cooling the core engine area of a turbojet propulsion system and relates particularly to the use of waste air from a laminar flow nacelle system as a source of engine core compartment cooling air.

2. Description of Prior Developments

Conventional turbojet propulsion systems include a core compartment cooling system which bleeds cooling air from the air cycle of the propulsion system. This cooling air is extracted through a variable bypass valve and directed to a manifold which distributes the air around the engine core compartment. Because this cooling air bypasses the core engine and escapes combustion, it detracts from the efficiency and performance of the propulsion system.

A system previously unrelated to the core compartment cooling system is known as a laminar flow nacelle system. This system improves the performance of turbojet engines by reducing drag around the fan cowl and engine nacelle by drawing air into the cowl from points along its outer surface. A pump is used to draw the air into the cowl and to exhaust the air into the engine fan compartment where it flows to atmosphere through a fan cowl vent port. The energy of the exhausted air is lost once the air enters the atmosphere. It would be advantageous to use this exhausted air for some additional engine function rather than to simply exhaust it to atmosphere.

Accordingly, a need exists for increasing the efficiency of a turbojet core engine compartment cooling system and for applying the exhaust air from a laminar flow nacelle system to some useful purpose.

SUMMARY OF THE INVENTION

The present invention has been developed to fulfill the needs noted above and therefore has as an object the use of waste air from a laminar flow nacelle system as the source of engine core compartment cooling air in lieu of air otherwise extracted from the air cycle of a jet propulsion system.

Another object of the invention is to provide a turbojet engine system that effectively makes use of the cool exhaust air pumped through a laminar flow nacelle system. The spent exhaust air is pumped into the aircraft bleed air system, preferably by a turbocompressor, to cool the core engine compartment and thereby usefully apply the energy of the airflow pumped through the laminar flow nacelle system.

Another object of the invention is to integrate and interconnect the laminar flow nacelle system and core compartment cooling system of a turbojet engine so as to improve engine efficiency.

Briefly, the invention is directed to the interconnection of cool exhaust air issuing from a laminar flow nacelle system to the inlet of a core compartment cooling system of a turbojet engine. Boundary layer airflow is drawn through an air pump and directed to a control valve which meters the flow of the suctioned air into a core compartment cooling manifold.

The control valve also controls the flow of engine bypass air into the cooling manifold so that bypass air exiting a variable bypass valve may be selectively admitted to the manifold as the sole source of cooling air or mixed with the exhaust airflow from the laminar flow nacelle system. Alternatively, the exhaust airflow from the laminar flow nacelle system may provide the sole source of cooling air.

The selection of the source of cooling air used to cool the core compartment of the propulsion system is dependent upon the mode of flight within which the propulsion system is operating. During the takeoff, climb and descent stages of flight, cooling air may be supplied exclusively in the form of engine bypass air. During airplane cruise operation, the cooling air may be supplied exclusively by the exhaust or waste air issuing from the laminar flow nacelle system. Alternatively, these two sources of cooling air may be combined in varying amounts during any flight mode as desired.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

Figure 1:
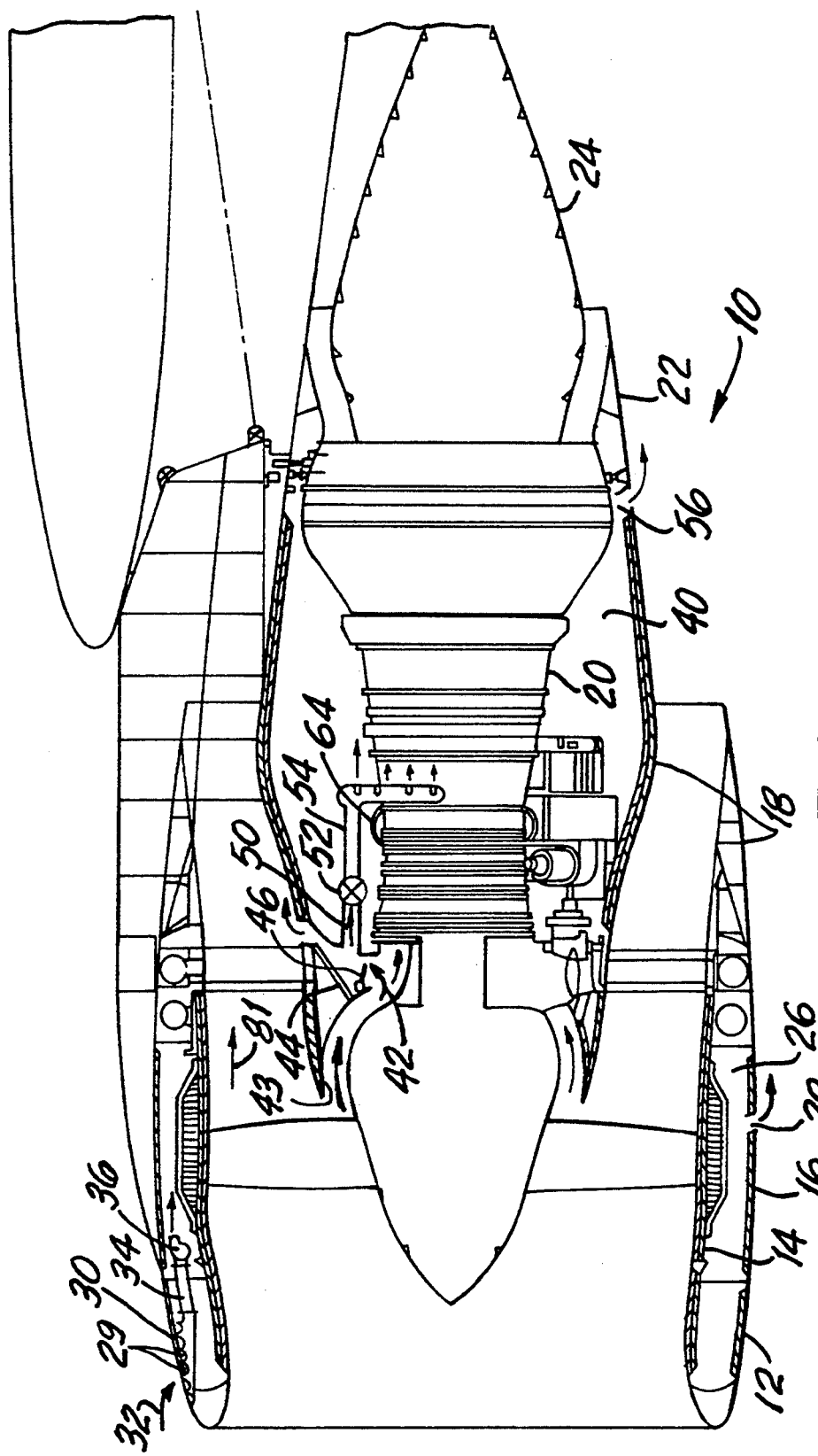
FIG. 1 is a schematic view in axial section of a conventional turbojet propulsion system which includes a laminar flow nacelle system and a separate core compartment cooling system according to the prior art.

The advantages and benefits of the present invention may be more fully appreciated by briefly reviewing the conventional commercial turbojet propulsion system 10 as depicted in FIG. 1. This system includes an annular axially-extending inlet 12 mounted to a turbojet engine fan case 14. The inlet 12 and the adjacent fan cowl 16 form a nacelle around the propulsion system.

The annular fan cowl 16 extends axially rearwardly from the air inlet 12 and is connected to a thrust reverser 18 which surrounds the propulsion system's jet engine core 20. Engine core 20 includes a typical compressor, turbine and combustor as is well known in the art. Exhaust nozzle 22 and centerbody 24 complete the aerodynamic flow path of the propulsion system 10.

Located radially inwardly of the fan cowl 16 and radially outwardly of the fan case 14 is an annular fan compartment 26. Disposed within fan compartment 26 and within inlet 12 are the components of a laminar flow nacelle system of known design. Boundary layer air surrounding the inlet 12 initially enters the laminar flow nacelle system through a series of small holes, apertures or inlet ports 29 formed through the outer surface of the inlet.

By drawing in ambient air along the boundary of the inlet 12, aerodynamic drag along the inlet and fan cowl 16 is reduced insofar as this suctioned air promotes and maintains a laminar flow of air over these external surfaces. The laminar flow nacelle system includes a plurality of flutes 30 through which boundary layer air 32 flows to an air duct 34 and into an air pump 36. Air pump 36 simply discharges the collected air into the fan compartment 26 where it flows to atmosphere through a fan cowl vent port 38.

Located between the fan thrust reverser 18 and the propulsion system engine core 20 is an annular core compartment 40. The core compartment is heated by radiation from the engine core 20 which is normally very hot. To cool components in the core compartment 40, bypass air 42 taken from the core inlet air duct 43 is selectively admitted into a propulsion system discharge plenum 44 through the actuation of a variable bypass valve 46.

The engine bypass air or booster discharge air 42 flows through a duct 50 to a control valve 52 and into a cooling air manifold 54. After flowing to distributed points within the core compartment 40, the cooling air exhausts to atmosphere through nozzle exit 56.

From this brief overview, it can be appreciated that prior turbojet propulsion systems of the type shown in FIG. 1 do not make any further use of the boundary layer air 32 after it has been exhausted through pump 36. In contrast, the present invention pumps the boundary layer air 32 into the core compartment cooling system for further use as a coolant.

In particular, the integration of the laminar flow nacelle system with the core compartment cooling system involves connecting the discharge air from the laminar flow nacelle system to the inlet of the core compartment cooling system and moving the air pump from the fan compartment 26 to the core compartment 40.

Figure 2:
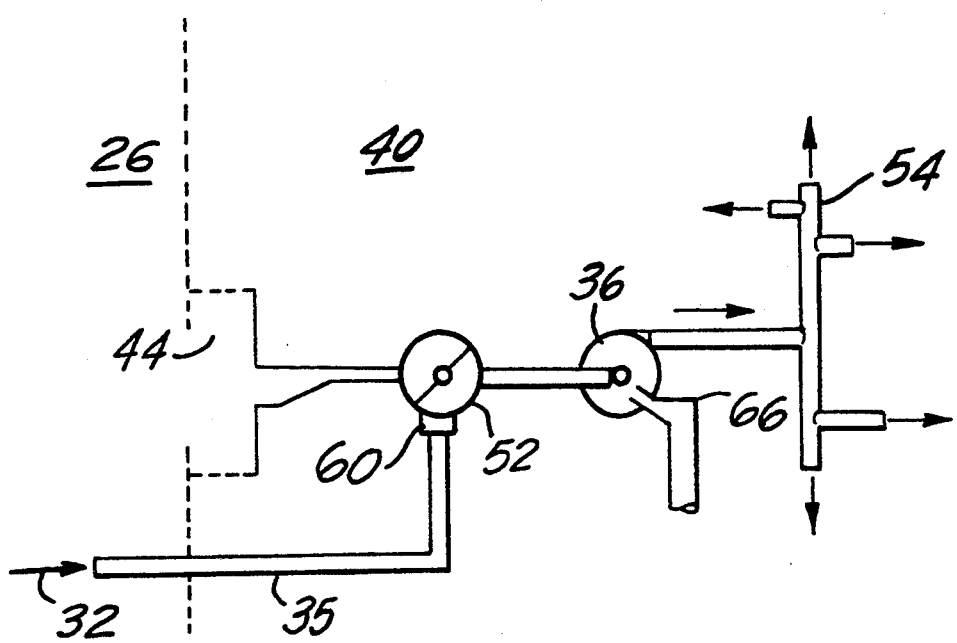
FIG. 2 is a schematic diagram of an integrated laminar flow nacelle system and core compartment cooling system according to the present invention.
Figure 3:
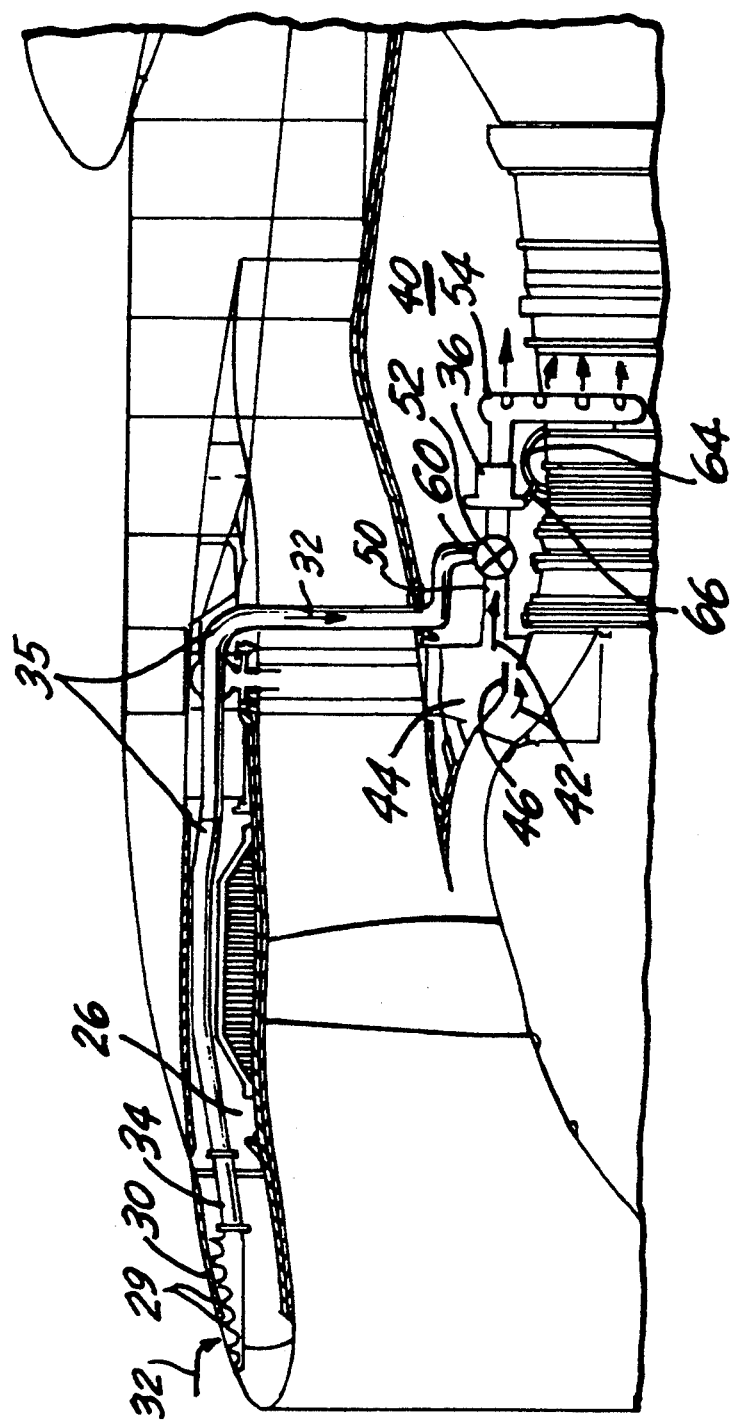
FIG. 3 is a schematic view in axial section of a turbojet propulsion system provided with an integrated laminar flow nacelle system and core compartment cooling system as represented diagrammatically in FIG. 2.

One example of such an integrated system is shown in FIGS. 2 and 3 wherein boundary layer airflow is drawn through the laminar flow nacelle inlet ports 29 and inlet flutes 30 to piping 35 which extends between the fan compartment 26 and the core compartment 40. Control valve 52 includes an additional port 60 to regulate admission of this suctioned air into pump 36. The suctioned air which passes through control valve 52 enters air pump 36 which forces the air through the core compartment cooling air manifold 54 to provide cooling as required.

During airplane cruise operation, the laminar flow nacelle system is typically operational. At this period of operation, the amount of air drawn through the inlet ports 29 for the purpose of reducing turbulence around the inlet is approximately the same as that required for adequately supplying cooling air to the core compartment cooling system. By integrating and interconnecting these two systems, the flow of core compartment cooling air from the variable bypass valve discharge plenum 44 may be selectively cut off by control valve 52 thereby effecting a reduction in ram air usage, specific fuel consumption, and fuel burned during flight.

During the takeoff, climb and descent portions of flight, the laminar flow nacelle system is not required to operate. During these same portions of flight, the existing conventional core compartment cooling system must provide the entire engine cooling airflow due to the much greater quantities of airflow which are required for cooling, hence, control valve 52 can operate to draw air from the variable bypass valve discharge plenum 44 as required. Alternately, control valve 52 can function as a mixing valve to draw air from both the laminar flow nacelle system through pipe 35 and through the variable bypass valve discharge chamber 44.

Air pump 36 can take various forms ranging from an electric fan to a mechanically driven compressor. Pump 36 is preferably pneumatically driven and can take the form of either a tip turbine fan or a turbocompressor. A tip turbine fan pumps and propels the laminar flow nacelle boundary layer suction flow 32 into the core compartment cooling system with an axial flow fan, while the turbocompressor uses a radial compressor of known design.

Tip turbine pumps are presently used in aircraft applications to inflate emergency exit slides and turbocompressor pumps are presently used in aircraft air conditioning systems. Both types of pumps as employed in the present invention are preferably powered with bleed air taken from a mid-stage bleed of the core engine compressor 64 as shown in FIGS. 2 and 3. The mid-stage air is ducted through a pipe 66 to the air pump 36.

If a tip turbine is employed as the pump 36, the hot mid-stage air from the core engine compressor is cooled when it passes through the turbine blades as work is extracted from the air. Depending on the temperature of the incoming mid stage air, the cooling effected by this work extraction may be sufficient to allow the tip turbine exhaust to be admitted and mixed into the pumped boundary layer suction air so that both flows may be used for cooling.

In the event the mid-stage air from the core engine compressor 64 is too hot and the tip turbine exhaust air is so warm as to prevent its use for cooling, this mid-stage air and its flow energy cannot be used further to improve the thermodynamic cycle of the propulsion system. To recover this energy loss from such hot running engines, the turbocompressor becomes the preferred type of air pump.

Figure 4:
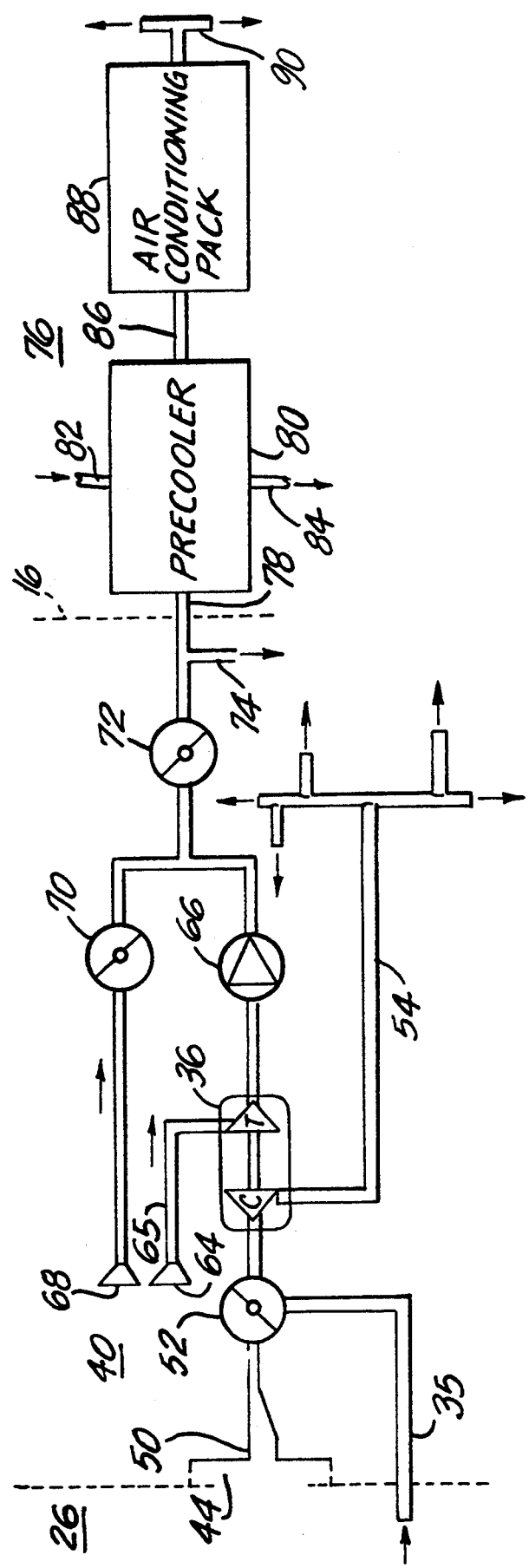
FIG. 4 is a schematic diagram of an alternate embodiment of the present invention which uses an alternate air power source for the turbocompressor pump for operating a laminar flow nacelle system and for pumping cooling air to a core engine compartment cooling manifold.

FIG. 4 shows a schematic flow diagram of a turbocompressor pump system adapted for use with an alternate embodiment of the invention. Again, boundary layer air is drawn into the turbocompressor pump 36 and pumped to the cooling distribution manifold 54. Of significance, air from the mid-stage manifold of core engine compressor 64 is piped to the turbine drive portion of the turbocompressor pump 36 and then passed to an environmental control system check valve 66.

The environmental control system includes a bleed air system which takes high pressure air from the propulsion system's core high pressure manifold 68, regulates its pressure in a high pressure valve 70, and further regulates its pressure in a pressure regulator and shutoff valve 72. The air is then sent to a starter through line 74 and through the aircraft cabin 76 via line 78 for passenger cabin pressurization and metabolic air supply.

Air from line 78 enters precooler 80, which may take the form of an air-to-air heat exchanger. Cooling bypass air 81 (FIG. 1) from the engine fan discharge enters the precooler through line 82 to cool the air from line 78 from about 400°–600° F. to about 370° F. Once heated, the bypass air from line 82 exits the precooler 80 through line 84 and is exhausted overboard.

The precooled air from line 78 exits the precooler 80 via line 86 and enters air conditioner pack 88 which further reduces the air temperature from about 370° F. to about 75° F. This cool 75° F. air may then be distributed throughout the aircraft cabin 76 via overhead ducts 90.

High pressure air from manifold 68 is used only during airplane descent and ground taxi. During takeoff, climb and cruise, air from the mid-stage of the core engine compressor 64 is used in place of high pressure air. This embodiment of the invention connects the turbocompressor air pump 36 into an intermediate pressure line of the core engine compressor via pipe 65 to extract a small amount of energy for operating the laminar flow nacelle system and for pumping cooling air into the core compartment.

Because the turbocompressor exhaust mid-stage air is still at sufficiently high pressure, it is fully usable for the environmental control system. In addition, the mid-stage air is slightly cooled as it does work in the turbocompressor. Thus, aircraft performance increases are effected by reducing aircraft environmental control system precooler and/or air conditioning pack ram air cooling flows.

There has been disclosed heretofore the best embodiment of the invention presently contemplated. However, it is to be understood that various changes and modifications may be made thereto without departing from the spirit of the invention.

What is claimed is:

1. A cooling system for a turbojet engine, comprising:
   nacelle means defining an air inlet leading into said engine, said nacelle means having port means disposed about said inlet for admitting air through said nacelle for promoting laminar flow around said nacelle;
   duct means disposed within said nacelle and communicating with said port means;
   a core engine disposed within said turbojet engine:
   core air inlet means disposed within said nacelle for providing air to said core engine;
   bypass means for bypassing air from said core air inlet mean around said core engine;
   pump means communicating with said duct means and said bypass mean for drawing cooling air from said duct means said bypass means and directing said air around said core engine; and
   valve means communicating with said duct means, said bypass means and said pump means;
   said valve means being adapted to regulate airflow from said bypass means and said duct means into said pump means and to permit mixing of said air drawn from said bypass means with said air drawn from said duct means, wherein said valve means permits a reduction in ram air usage and specific fuel consumption of said turbojet engine during selected operating conditions of said turbojet engine relative to an otherwise similar turbojet engine utilizing engine cycle air as the sole source of cooling air directed around a core engine of the otherwise similar turbojet engine.

2. The system of claim 1, further comprising a manifold disposed adjacent to said core engine and connected to said pump means for distributing said cooling air around said core engine.

3. The system of claim 1, wherein said pump means comprises a turbocompressor.

4. The system of claim 1, wherein said pump means comprises a tip turbine.

5. The system of claim 1, wherein said turbojet engine comprises a core engine compartment surrounding said core engine and wherein said pump means is disposed within said core engine compartment.

6. The system of claim 1, wherein said core engine comprises a compressor and wherein said pump means is driven by air from said compressor.

* * * * *